(12) United States Patent  
Cain (10) Patent No.: US 9,118,548 B2  
(45) Date of Patent: *Aug. 25, 2015

(54) SYSTEM, DEVICE AND METHOD FOR DISTRIBUTING LINK STATE INFORMATION IN A COMMUNICATION NETWORK

(71) Applicant: RPX CLEARINGHOUSE LLC, San Francisco, CA (US)

(72) Inventor: Bradley Cain, Cambridge, MA (US)

(73) Assignee: RPX CLEARINGHOUSE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/313,261

(22) Filed: Jun. 24, 2014

(65) Prior Publication Data

US 2014/0307584 A1 Oct. 16, 2014

Related U.S. Application Data

(63) Continuation of application No. 13/479,925, filed on May 24, 2012, now Pat. No. 8,848,527, which is a continuation of application No. 09/455,955, filed on Dec. 7, 1999, now Pat. No. 8,199,646.

(51) Int. Cl.
| | |
|---|---|
| H04L 12/54 | (2013.01) |
| H04L 12/24 | (2006.01) |
| H04L 12/751 | (2013.01) |
| H04L 12/26 | (2006.01) |

(52) U.S. Cl.
CPC ........ *H04L 41/0686* (2013.01); *H04L 41/0816* (2013.01); *H04L 43/0823* (2013.01); *H04L 45/02* (2013.01)

(58) Field of Classification Search
None
See application file for complete search history.

(56) References Cited

U.S. PATENT DOCUMENTS

| | | | |
|---|---|---|---|
| 4,726,027 A | 2/1988 | Nakamura et al. | |
| 5,764,625 A | 6/1998 | Bournas | |
| 6,266,701 B1 | 7/2001 | Sridhar et al. | |
| 6,389,016 B1 | 5/2002 | Sabaa et al. | |
| 6,473,425 B1 | 10/2002 | Bellaton et al. | |
| 6,493,316 B1 | 12/2002 | Chapman et al. | |
| 6,496,481 B1 | 12/2002 | Wu et al. | |
| 6,560,243 B1 | 5/2003 | Mogul | |
| 6,614,757 B1 | 9/2003 | Rochberger et al. | |
| 7,342,897 B1 | 3/2008 | Nadar et al. | |
| 8,199,646 B1 * | 6/2012 | Cain | 370/231 |
| 8,848,527 B2 * | 9/2014 | Cain | 370/231 |
| 2001/0033548 A1 * | 10/2001 | Saleh et al. | 370/218 |
| 2003/0058804 A1 | 3/2003 | Saleh et al. | |
| 2004/0075872 A1 | 4/2004 | Adler et al. | |

OTHER PUBLICATIONS

"Internetworking with TCP/IP", vol. 1, Douglas E. Corner, Department of Computer Sciences, Purdue University, 1991, pp. 173-177.

* cited by examiner

*Primary Examiner* — Eunsook Choi
*Assistant Examiner* — Duc Duong
(74) *Attorney, Agent, or Firm* — BainwoodHuang (57) ABSTRACT

A system, device, and method for distributing link state information in a communication network combines a link state routing protocol with a sliding window mechanism in order to efficiently distribute link state information. The sliding window mechanism permits a predetermined number of unacknowledged link state advertisement protocol messages to be outstanding at any given time. Unacknowledged link state advertisement protocol messages are retransmitted after a predetermined timeout period.

13 Claims, 5 Drawing Sheets

SYSTEM, DEVICE AND METHOD FOR DISTRIBUTING LINK STATE INFORMATION IN A COMMUNICATION NETWORK

FIELD OF THE INVENTION

The present invention relates generally to communication systems, and more particularly to distributing link state information in a communication system.

BACKGROUND OF THE INVENTION

In today's information age, communication networks are often used for interconnecting computers and computer peripherals. A communication network typically includes a number of nodes that interoperate to route protocol messages. The various nodes in the communication network utilize various routing protocols in order to determine the routes that are used to route the protocol messages.

One type of routing protocol, known as a "link state" routing protocol, determines routes based upon the status of communication links between the various nodes. A link state routing protocol, such as the Open Shortest Path First (OSPF) routing protocol, requires each node to have complete topology information. Each node maintains a topology database that indicates all nodes in the communication network and lists the communication links that are associated with each node.

The various nodes in the communication network exchange link state information using link state advertisement (LSA) protocol messages. Link state information is exchanged at various times. In particular, when a node is initialized, the node needs to obtain link state information in order to determine routes for routing protocol messages, and therefore the node's neighbors send LSA protocol messages to the node in order to provide the node with the necessary link state information. Also, each node periodically tests the communication links to each of its neighbors and sends a LSA protocol message including the link status information to all of the other nodes. When a failure occurs in the communication network (such as a communication link failure or a node failure), the various nodes in the communication network need to obtain updated link state information in order to determine new routes for routing protocol messages around the failure, and therefore the nodes adjacent to the failure send LSA protocol messages to the other nodes in the communication network in order to inform all nodes of the failure. Each node computes the routes based upon the link status information received from the other nodes.

Any time link state information is exchanged, it is desirable for the link state information to be distributed quickly in order for the receiving node(s) to determine new routes for routing protocol messages. Unfortunately, routing protocols utilize a "stop-and-wait" mechanism for distributing link state information. When a node sends an LSA protocol message to a neighbor, the node waits for an acknowledgment from the neighbor before sending another ISA protocol message. This is a very simple but inefficient way to distribute link state information.

An efficient technique for distributing link state information is needed.

SUMMARY OF THE INVENTION

In accordance with one aspect of the invention, a link state routing protocol utilizes a sliding window mechanism to efficiently distribute link state information. The sliding window mechanism permits a predetermined number of unacknowledged link state advertisement protocol messages to be outstanding at any given time. Unacknowledged link state advertisement protocol messages are retransmitted after a predetermined timeout period.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An exemplary embodiment of the present invention uses a sliding window mechanism for distributing link state information. A sliding window mechanism permits a node to send multiple protocol messages without waiting for individual acknowledgments. The node can therefore have multiple unacknowledged protocol messages outstanding at any given time. The number of unacknowledged protocol messages that are permitted to be outstanding is referred to as a "window size." A typical embodiment might use a window size of eight (8) or 128, although the window size may be set to other values and may be set based upon network characteristics (such as round trip delay to a neighbor) or other considerations. It should be noted that a window size of one (1) degenerates to a "stop-and-wait" mechanism. The neighbor may acknowledge protocol messages one at a time, or may acknowledge multiple protocol messages together. Unacknowledged protocol messages may be retransmitted after a predetermined timeout period.

In an exemplary embodiment of the present invention, a node is permitted to have a predetermined number of unacknowledged ISA protocol messages outstanding at any time. Thus, when the node needs to send link state information to a neighbor, the node is permitted to send multiple LSA protocol messages without waiting for individual acknowledgments for each LSA protocol message. The window size may be sufficient for the node to send all LSA protocol messages that it needs to send to the neighbor. However, assuming the node needs to send more LSA protocol messages than the window size allows, the node stops sending LSA protocol messages if and when the maximum number of unacknowledged outstanding LSA protocol messages is reached. The window size is preferably set so that, as long as there are no communication errors, the neighbor will acknowledge the LSA protocol messages quickly enough that the node does not have to stop sending LSA protocol messages. If a communication error occurs, the node may retransmit any unacknowledged LSA protocol messages.

There are many types of sliding window mechanisms, and an embodiment of the present invention may employ any applicable sliding window mechanism. The present invention is in no way limited to the type of sliding window mechanism employed.

In an exemplary sliding window mechanism, the node inserts a sequence number in each LSA protocol message. The sequence numbers typically start at zero (0) and increment to the window size minus one (1) before wrapping back to zero (0). In other words, the sequence number is modulo N, where N is the window size. The neighbor may be required to acknowledge each individual LSA protocol message, for example, by sending the sequence number of the LSA protocol message being acknowledged, or the neighbor may be permitted to acknowledge multiple consecutive LSA protocol messages, for example, by sending the sequence number of the last LSA protocol message in the sequence of LSA protocol messages being acknowledged. The neighbor may or may not be permitted to acknowledge LSA protocol messages received out of sequence or received after a dropped or missing LSA protocol message. Various retransmission techniques require the node to save unacknowledged LSA protocol messages in case the node needs to retransmit one or more ISA protocol messages. The node may be required to retransmit all LSA protocol messages following an unacknowledged LSA protocol message, or may be permitted to retransmit individual unacknowledged LSA protocol messages.

Figure 1:
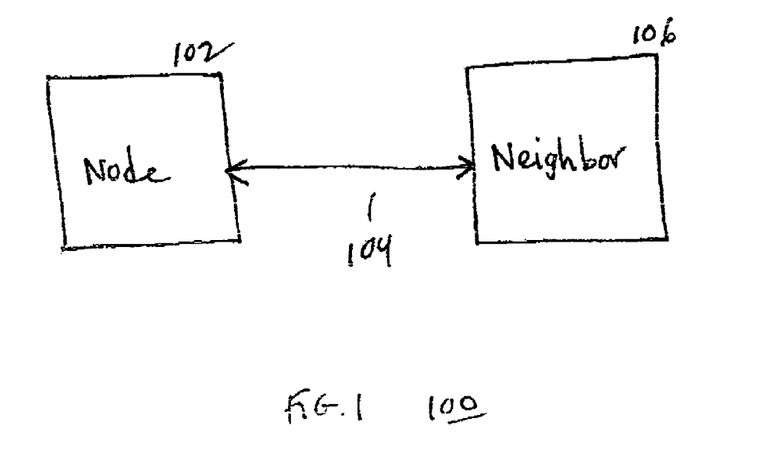
FIG. 1 is a block diagram showing an exemplary communication network in accordance with an embodiment of the invention.

FIG. 1 is a block diagram showing an exemplary communication network 100 in accordance with an embodiment of the invention. The communication network 100 includes, among other things, a node 102 and a neighbor 106 coupled over a communication link 104. The node 102 and the neighbor 106 interoperate to route protocol messages within the communication network 100. Specifically, the node 102 and the neighbor 106 implement a link state routing protocol for determining routes within the communication network 100.

Figure 2:
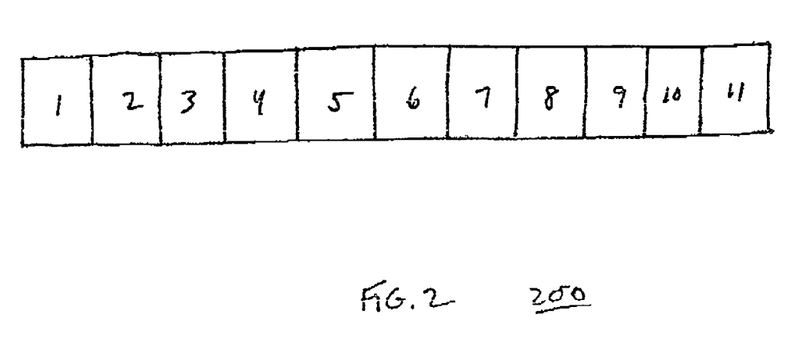
FIG. 2 is a block diagram depicting a series of LSA protocol messages in accordance with an embodiment of the invention.

Implementation of the link state routing protocol requires the node 102 and the neighbor 106 to exchange LSA protocol messages over the communication link 104. During a particular LSA protocol message exchange, the node 102 may need to send multiple LSA protocol messages to the neighbor 106 over the communication link 104. FIG. 2 depicts a series of eleven (11) protocol messages 200 to be sent by the node 102 to the neighbor 106 over the communication link 104.

Figure 3:
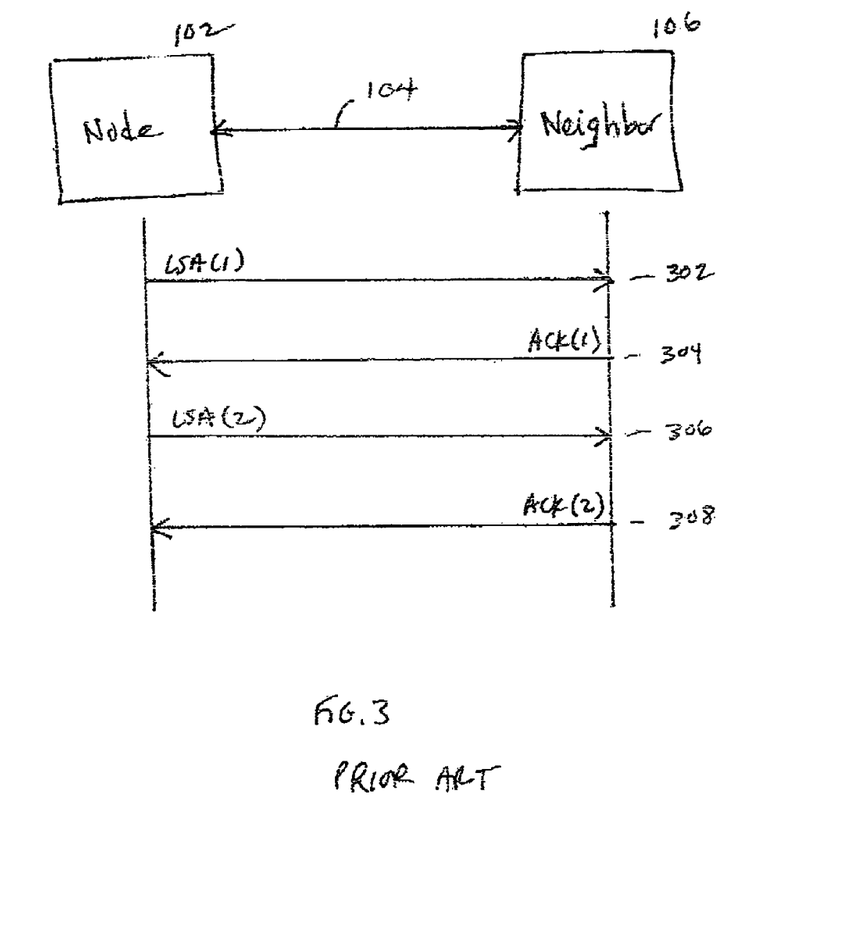
FIG. 3 is a message flow diagram depicting an LSA protocol message exchange by a link state routing protocol using a "stop-and-wait" mechanism as known in the art.

In a prior art embodiment, the node 102 sends the series of LSA protocol messages 200 to the neighbor 106 over the communication link 104 using a "stop-and-wait" mechanism. FIG. 3 is a message flow diagram depicting an LSA protocol message exchange by a link state routing protocol using a "stop-and-wait" mechanism. The node 102 sends one LSA protocol message at a time to the neighbor 106, and waits for an acknowledgment from the neighbor 106 before sending another LSA protocol message to the neighbor 106. Thus, the node 102 sends the first LSA protocol message 302 to the neighbor 106, and waits for an acknowledgment from the neighbor 106. Upon receiving the acknowledgment 304 from the neighbor 106, the node 102 sends the second LSA protocol message 306 to the neighbor 106, and waits for an acknowledgment from the neighbor 106. Upon receiving the acknowledgment 308 from the neighbor 106, the node 102 proceeds to send subsequent LSA protocol messages (not shown) in the same manner, until all LSA protocol messages have been sent and acknowledged.

Figure 4:
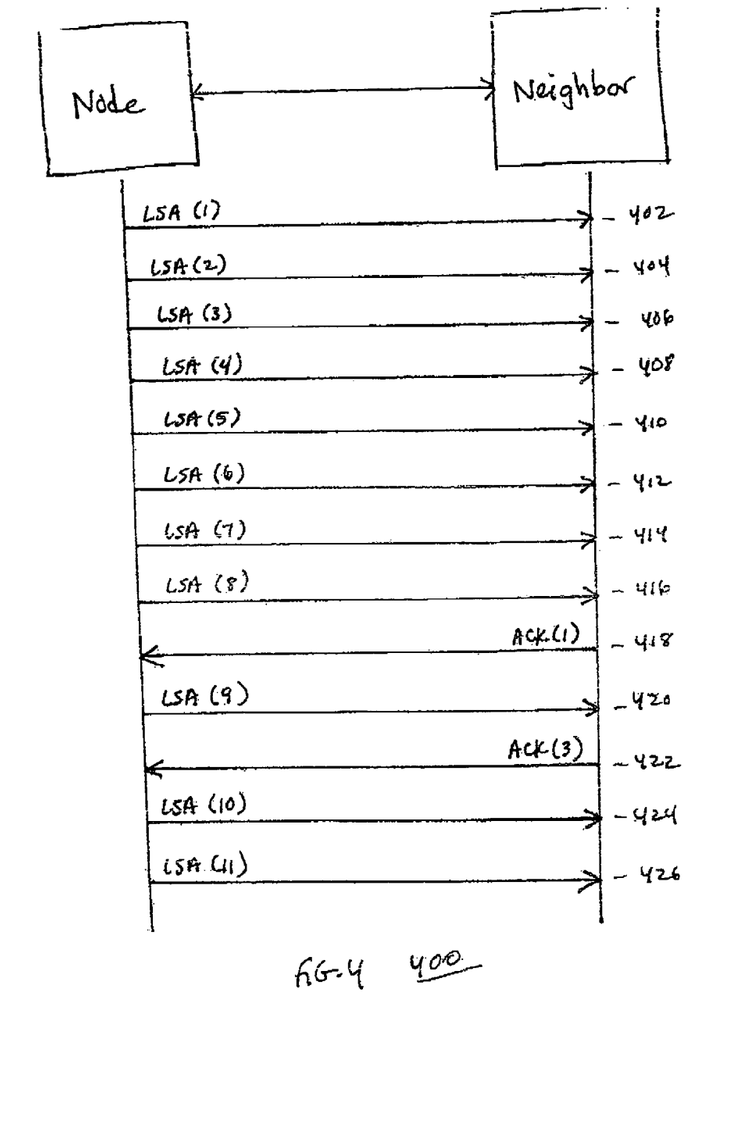
FIG. 4 is a message flow diagram depicting an LSA protocol message exchange by a link state routing protocol using a sliding window mechanism in accordance with an embodiment of the invention.
Figure 5:
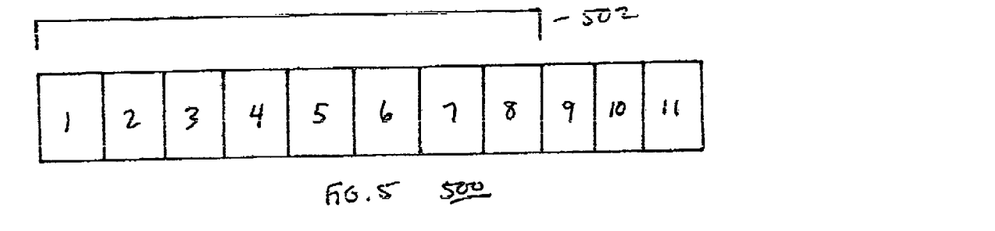
FIG. 5 is a block diagram depicting a sliding window in a first position during an LSA protocol message exchange in accordance with an embodiment of the invention.

In an exemplary embodiment of the invention, the node 102 sends the series of LSA protocol messages 200 to the neighbor 106 over the communication link 104 using a sliding window mechanism. FIG. 4 is a message flow diagram depicting an LSA protocol message exchange by a link state routing protocol using a sliding window mechanism using a window size of eight (8). The node 102 is permitted to have up to eight (8) unacknowledged LSA protocol messages outstanding at any given time. Thus, the node 102 may send the first eight (8) LSA protocol messages (402, 404, 406, 408, 410, 412, 414, 416) to the neighbor 106 before the node 102 must stop to wait for an acknowledgment from the neighbor 106 for at least one of the LSA protocol messages. At this point, there are eight (8) unacknowledged LSA protocol messages outstanding, specifically the LSA protocol messages (402, 404, 406, 408, 410, 412, 414, 416). FIG. 5 depicts the position of the sliding window 502 after the node 102 sends the first eight (8) LSA protocol messages to the neighbor 106.

Figure 6:
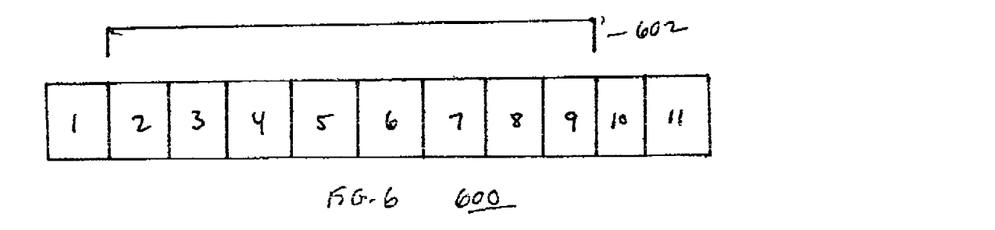
FIG. 6 is a block diagram depicting a sliding window in a second position during an LSA protocol message exchange in accordance with an embodiment of the invention.

Upon receiving an acknowledgment 418 for the first LSA protocol message 402 from the neighbor 106, the node 102 sends the ninth LSA protocol message 420 to the neighbor 106. At this point, there are eight (8) unacknowledged LSA protocol messages outstanding, specifically the LSA protocol messages (404, 406, 408, 410, 412, 414, 416, 420). FIG. 6 depicts the position of the sliding window 602 after the node 102 sends the ninth LSA protocol message 420 to the neighbor 106.

Figure 7:
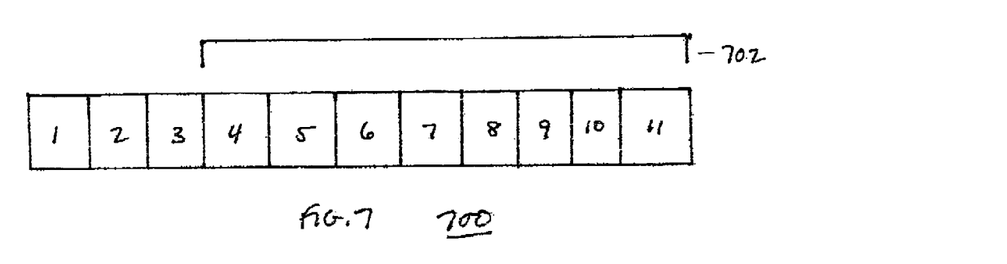
FIG. 7 is a block diagram depicting a sliding window in a third position during an LSA protocol message exchange in accordance with an embodiment of the invention.

Upon receiving an acknowledgment 422 for the second and third LSA protocol messages (404, 406) from the neighbor 106, the node 102 sends the tenth and eleventh LSA protocol messages (424, 426) to the neighbor 106. At this point, there are eight (8) unacknowledged LSA protocol messages outstanding, specifically the LSA protocol messages (408, 410, 412, 414, 416, 420, 424, 426). FIG. 7 depicts the position of the sliding window 702 after the node 102 sends the tenth and eleventh LSA protocol messages (424, 426) to the neighbor 106.

In actuality, the neighbor 106 typically sends acknowledgments as it receives and processes the LSA protocol messages. The neighbor 106 may acknowledge each LSA protocol message individually, or, as with the acknowledgment 422 shown in HG. 4, the neighbor 106 may acknowledge multiple LSA protocol messages simultaneously. Thus, the node 102 typically receives one or more acknowledgment messages from the neighbor 106 before reaching the maximum number of outstanding unacknowledged LSA protocol messages, and therefore the node 102 generally does not have to stop sending LSA protocol messages in order to wait for acknowledgment messages from the neighbor 106.

In the course of the LSA protocol message exchange between the node 102 and the neighbor 106, it is possible for certain protocol messages to be lost. This may be due to a communication error on the communication link 104 or other reason. Protocol messages may be lost in either direction. For example, the neighbor 106 may not receive one or more LSA protocol messages sent by the node 102, in which case the neighbor does not acknowledge the lost LSA protocol message(s). Also, the node 102 may not receive one or more acknowledgment messages sent by the neighbor 106. In either case, the node 102 detects the error condition by failing to receive an acknowledgment message for a particular LSA protocol message within a predetermined timeout period. The node 102 preferably retransmits unacknowledged LSA protocol messages after a predetermined timeout period. The node 102 may retransmit only specific unacknowledged LSA protocol messages, although it is more typical for the node 102 to retransmit all LSA protocol messages from the unacknowledged LSA protocol message onward. Thus, assuming the LSA protocol messages (408, 410, 412, 414, 416, 420, 424, 426) are outstanding, as depicted by the sliding window 702 as shown in FIG. 7, and the LSA protocol message 408 is unacknowledged, then the node 102 typically retransmits the LSA protocol messages (408, 410, 412, 414, 416, 420, 424, 426). This is true even if the neighbor 106 received some or all of the LSA protocol messages after the LSA protocol message 408.

In various embodiments of the invention, the sliding window mechanism may be integrated with an existing link state routing protocol, such as OSPF, or may be used in a new link state routing protocol. The present invention is in no way limited to a specific link state routing protocol.

In an exemplary embodiment of the present invention, predominantly all of the routing protocol logic including the sliding window logic is implemented as a set of computer program instructions that are stored in a computer readable medium and executed by an embedded microprocessor system within a node. Various embodiments of the invention may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

The invention claimed is:

1. A device for distributing link state information in a communication system, the device comprising:
    at least one communication interface;
    at least one processor communicatively coupled to the at least one communication interface; and at least one processor-readable medium storing instructions for execution by the at least one processor, the instructions comprising:
        instructions executable by the at least one processor to send a first link state advertisement protocol message to a neighbor device via the at least one communication interface;
        instructions executable by the at least one processor to send a second link state advertisement protocol message via the at least one communication interface to the neighbor device prior to receiving an acknowledgement message for the first link state advertisement protocol message from the neighbor device,
        instructions executable by the at least one processor to monitor the at least one communication interface for an acknowledgement message for the first link state advertisement protocol message from the neighbor device,
        instructions executable by the at least one processor to retransmit the first link state advertisement protocol message responsive to failing to receive the acknowledgement message for the first link state advertisement protocol message from the neighbor device within a predetermined timeout period; and
    wherein the instructions are configured to send up to a predetermined maximum number of link state advertisement protocol messages to the neighbor device without receiving an acknowledgement for any of the link state advertisement protocol messages from the neighbor device.

2. The device of claim 1, wherein the instructions further comprise instructions executable by the at least one processor to retransmit the second link state advertisement protocol message.

3. The device of claim 1, wherein the instructions further comprise:
    instructions executable by the at least one processor to monitor the at least one communication interface for an acknowledgement message for the second link state advertisement protocol message from the neighbor device; and
    instructions executable by the at least one processor to retransmit the second link state advertisement protocol message responsive to failing to receive the acknowledgement message for the second link state advertisement protocol message from the neighbor device within the predetermined timeout period.

4. A device for distributing link state information in a communication system, the device comprising:
    at least one communication interface;
    at least one processor communicatively coupled to the at least one communication interface; and at least one processor-readable medium storing instructions for execution by the at least one processor, the instructions comprising:
        instructions executable by the at least one processor to send a first link state advertisement protocol message to a neighbor device via the at least one communication interface,
        instructions executable by the at least one processor to send a second link state advertisement protocol message via the at least one communication interface to the neighbor device prior to receiving an acknowledgement message for the first link state advertisement protocol message from the neighbor device, instructions executable by the at least one processor to monitor the at least one communication interface for an acknowledgement message for the first link state advertisement protocol message from the neighbor device, and instructions executable by the at least one processor to retransmit the first link state advertisement protocol message responsive to failing to receive the acknowledgement message for the first link state advertisement protocol message from the neighbor device within a predetermined timeout period; and wherein the instructions are configured to send up to a predetermined maximum number of link state advertisement protocol messages to the neighbor device without waiting for an acknowledgement for any of the link state advertisement protocol messages from the neighbor device.

5. A device for distributing link state information in a communication system, the device comprising:

at least one communication interface;

at least one processor communicatively coupled to the at least one communication interface; and at least one processor-readable medium storing instructions for execution by the at least one processor, the instructions comprising:

instructions executable by the at least one processor to send a first link state advertisement protocol message to a neighbor device via the at least one communication interface, instructions executable by the at least one processor to send a second link state advertisement protocol message via the at least one communication interface to the neighbor device prior to receiving an acknowledgement message for the first link state advertisement protocol message from the neighbor device, instructions executable by the at least one processor to monitor the at least one communication interface for an acknowledgement message for the first link state advertisement protocol message from the neighbor device, and instructions executable by the at least one processor to retransmit the first link state advertisement protocol message responsive to failing to receive the acknowledgement message for the first link state advertisement protocol message from the neighbor device within a predetermined timeout period; and wherein the instructions are configured:

to send a predetermined maximum number of link state advertisement protocol messages to the neighbor device, and to wait for an acknowledgement message from the neighbor device for at least one of the link state advertisement protocol messages before sending any more link state advertisement protocol messages to the neighbor device.

6. A device for distributing link state information in a communication system, the device comprising:

at least one communication interface;

at least one processor communicatively coupled to the at least one communication interface; and at least one processor-readable medium storing instructions for execution by the at least one processor, the instructions comprising:

instructions executable by the at least one processor to send a first link state advertisement protocol message to a neighbor device via the at least one communication interface, instructions executable by the at least one processor to send a second link state advertisement protocol message via the at least one communication interface to the neighbor device prior to receiving an acknowledgement message for the first link state advertisement protocol message from the neighbor device, instructions executable by the at least one processor to monitor the at least one communication interface for an acknowledgement message for the first link state advertisement protocol message from the neighbor device, and instructions executable by the at least one processor to retransmit the first link state advertisement protocol message responsive to failing to receive the acknowledgement message for the first link state advertisement protocol message from the neighbor device within a predetermined timeout period; and wherein the instructions implement a link state routing protocol having a sliding window mechanism with a window size greater than one (1) for sending up to a predetermined maximum number of link state advertisement protocol messages without receiving an acknowledgement for any of said link state advertisement protocol messages.

7. The device of claim 6, wherein the instructions implementing the link state routing protocol comprise:

instructions executable to send link state advertisement protocol messages; and instructions executable to maintain a sliding window for sending up to a predetermined maximum number of link state advertisement protocol messages to the neighbor device without receiving an acknowledgement for any of said link state advertisement protocol messages from the neighbor device.

8. The device of claim 7, wherein the instructions executable to maintain the sliding window comprise:

instructions executable to send a first link state advertisement protocol message to the neighbor device; and instructions executable to send a second link state advertisement protocol message to the neighbor device prior to receiving an acknowledgement message for the first link state advertisement protocol message from the neighbor device.

9. The device of claim 8, wherein the instructions executable to maintain the sliding window comprise:

instructions executable to monitor for an acknowledgement message for the first link state advertisement protocol message from the neighbor device; and instructions executable to retransmit the first link state advertisement protocol message upon failing to receive the acknowledgement message for the first link state advertisement protocol message from the neighbor device within a predetermined timeout period.

10. The device of claim 9, wherein the instructions executable to maintain the sliding window comprise instructions executable to retransmit the second link state advertisement protocol message.

11. The device of claim 7, wherein the instructions executable to maintain the sliding window comprise instructions executable to send the predetermined maximum number of link state advertisement protocol messages to the neighbor and to wait for an acknowledgement message from the neighbor for at least one of the link state advertisement protocol messages before sending another link state advertisement protocol message.

12. The device of claim 11, wherein the instructions executable to maintain the sliding window comprise:
   instructions executable to receive the acknowledgement message for a first link state advertisement protocol message from the neighbor device; and
   instructions executable to send another link state advertisement protocol message.

13. The device of claim 11, wherein the instructions executable to maintain the sliding window comprise instructions executable to retransmit at least a first unacknowledged link state advertisement protocol message upon failing to receive the acknowledgement message from the neighbor device within a predetermined timeout period.

* * * * *